(12) United States Patent
Okubo et al.

(10) Patent No.: US 6,515,442 B1
(45) Date of Patent: Feb. 4, 2003

(54) POSITION CONTROLLER

(75) Inventors: Tadashi Okubo, Kitakyushu (JP); Wennong Zhang, Kitaskyushu (JP); Yasuhiko Kaku, Kitaskyushu (JP); Kenichi Murata, Kitaskyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/806,025

(22) PCT Filed: Sep. 27, 1999

(86) PCT No.: PCT/JP99/05238
§ 371 (c)(1),
(2), (4) Date: May 24, 2001

(87) PCT Pub. No.: WO00/19288
PCT Pub. Date: Apr. 6, 2000

(30) Foreign Application Priority Data

Sep. 28, 1998 (JP) ............................................. 10-273508
Sep. 29, 1998 (JP) ............................................. 10-275077

(51) Int. Cl.[7] ............................................... G05B 11/01
(52) U.S. Cl. ............. 318/560; 318/568.18; 318/568.22; 318/615; 318/618; 318/632
(58) Field of Search ............................ 318/560, 568.18, 318/568.22, 615, 618, 632

(56) References Cited

U.S. PATENT DOCUMENTS

| | | | |
|---|---|---|---|
| 4,535,277 A | * | 8/1985 | Kurakake .................... 318/561 |
| 5,410,234 A | * | 4/1995 | Shibata et al. ............... 318/700 |
| 5,646,495 A | * | 7/1997 | Toyozawa et al. ........... 318/625 |
| 5,652,491 A | * | 7/1997 | Ikawa et al. ................. 318/632 |
| 5,694,016 A | | 12/1997 | Heinkel |
| 6,252,369 B1 | * | 6/2001 | Kaku et al. .................. 318/609 |

* cited by examiner

*Primary Examiner*—Jonathan Salata
*Assistant Examiner*—Rina I. Duda
(74) *Attorney, Agent, or Firm*—Armstrong, Westerman & Hattori, LLP

(57) ABSTRACT

To overcome the problem of a low frequency disturbance causing minute vibrations affecting response attributable to the difficulty of adaption to the phase of the vibrations, the present invention provides a position controller, which includes a subtracter for subtracting a motor position signal from a movement position signal to produce an angle-of-twist signal; a high-pass filter for advancing the phase of the angle-of-twist signal; a low pass filter for eliminating only high-frequency components of the signal received from the high-pass filter; a circuit for multiplying the signal from a low-pass filter by a torque-corrective gain to produce a torque-corrected signal; a torque correction evaluation section for varying the torque-corrective gain according to the position deviation signal that is the difference between a position command and the movement position signal; and a subtracter for combining the torque-corrective signal and the torque command to produce a new torque command.

8 Claims, 10 Drawing Sheets

(a)

(b)

POSITION CONTROLLER

TECHNICAL FIELD OF THE INVENTION

The present invention relates to a position controller provided with a compensation means for suppressing vibration produced in a mechanism driven by a motor when the motor controls a position by driving an object to be controlled and, in particular, it relates to a position controller capable of positioning with high accuracy in a short time when a low-frequency disturbance is large.

BACKGROUND OF THE ART

Generally, for position control, a position signal of an encoder and the like attached to a servomotor is differentiated to produce a speed feedback signal and speed control is performed, and based on a position feedback signal from a position detector such as a linear scale and the like attached to a movement section driven by the servomotor (or an encoder and the like attached to the servomotor), position control is performed. A block diagram of such a position control system is as shown in FIG. 9.

In FIG. 9, 901 denotes a position control section and a position control gain is $K_p$. 902 denotes a speed control section, 903 denotes a servomotor, and 904 denotes a movement section. Position deviation $e_p$ is determined by subtracting position feedback signal $y_f$ from position command $y_r$ outputted from a numerical value controller and speed command $v_r$ is determined by multiplying this position deviation by the position control gain $K_p$. Speed deviation $e_v$ is determined by subtracting speed feedback signal $v_f$ from this speed command $v_r$, torque command (current command) $T_r$ is determined based on said speed deviation $e_v$ in the speed control section 902, and the servomotor 903 and the movement section 904 are driven based on said torque command $T_r$.

A control method for a motor whereby position control is performed based on a signal from a position detector such as a linear scale attached to a movement section driven by a motor is known as a closed loop method. However, if a motor and a movement section are spring-connected and the rigidity of the connected portion is weak, the movement of the motor and movement section does not coincide and vibration occurs. In such a case, it is necessary to stabilize the loop by lowering a loop gain or to apply a method for stabilizing the loop, without lowering the loop gain, by correcting a torque command value based on a movement position, a movement speed and a motor position, or a motor speed. As a method for stabilizing the loop by correcting a torque command value, there is Japanese Unexamined Patent Publication No. Hei-3-110307, for example. Therein, the loop is stabilized by correcting the torque command value based on the difference between the movement section speed and motor speed. A method whereby the loop is stabilized by correcting the torque command value based on the difference between the movement section speed and motor speed has also been indicated in the literature and the like (for example in "The theory of AC servo system and practice of design" written and edited by Hidehiko SUGIMOTO, Sougo-denshi Shuppansha.)

FIG. 8 is a block diagram for explaining the prior-art method whereby the loop is stabilized by correcting the torque command value.

In FIG. 8, 12 denotes a position control section in which position command Pref and detected movement position Pfbl are inputted and from which speed command Vref is outputted, and which position-controls a motor so that the abovementioned two input signals coincide, 13 denotes a speed control section in which the speed command Vref and operated motor speed Vfbm are inputted and from which torque command Terf is outputted, and which speed-controls a motor so that the abovedescribed two input signals coincide, 18 denotes a speed processor which receives motor position signal Pfbm as an output signal from a motor position detector to differentiate the signal and outputs the abovedescribed motor speed Vfbm, and 32 denotes a movement section speed process or which receives movement position signal Pfbl as an output signal from a movement position detector to differentiate the signal and outputs movement speed Vfbl. 21 denotes a subtracter which subtracts the movement position Pfbl from the position command Pref and outputs a position deviation signal, 22 denotes a position controller which receives the position deviation signal and outputs speed command Vref, 23 denotes a subtracter which subtracts the motor speed signal Vfbm from the speed command Vref and outputs a speed deviation, 24 denotes a speed controller which receives the speed deviation and outputs torque command, 25 denotes a subtracter which operates the difference between the movement speed signal Vfbl and the motor speed signal Vfbm to output, 28 denotes a coefficient multiplier which multiplies the difference between the abovedescribed movement speed signal Vfbl and the motor speed signal Vfbm by a coefficient α as a torque corrective gain and outputs the torque correction signal, and 31 denotes a subtracter which subtracts a torque correction signal from the torque command and outputs a new torque command Tref.

FIG. 10 is a system construction view to which the position control system is applied. 100 denotes a base, 101 denotes a ball screw, 102 denotes a table, 103 denotes a servomotor, 104 denotes a linear scale for detecting a position of the table, and 105 denotes a measuring head. The servomotor 103 drives the table 102 via the ball screw 101. All of the drive mechanism and non-movement portions of to-be-driven bodies are fixed on the same base 100 and the base 100 is installed on the ground. The main body of the linear scale 104 is arranged on the base 100 and the measuring head 105 is attached on the table 102. The control system position-controls the table 102 based on a position signal from the linear scale 104.

In recent years, the demand for higher speed industrial machines has increased, therefore a command is issued with an acceleration (deceleration) time made as short as possible (that is, by increasing acceleration (deceleration) as far as possible). In a case where the base 100 with a mechanism having a low rigidity is arranged on the ground, when the table is driven at high acceleration (deceleration), the base 100 receives the reaction force of the acceleration (deceleration) and vibrates severely. For the control system, the vibration of the base 100 becomes a disturbance signal of a position signal. In addition, the lower the rigidity of the combination mechanism between the servomotor 103 and the table 102 is, the greater the influence on positioning by the vibration of the base 100 becomes.

However in the abovedescribed prior art of FIG. 9, there has been a great drawback in that positioning with high accuracy is impossible in a short time when a large low-frequency disturbance exists. In the abovedescribed prior art of FIG. 8, there have been problems in that when low-frequency disturbance exists and minute vibration occurs, the phase of the torque correction signal and the phase of the vibration do not match each other, so the disturbance cannot be suppressed, thereby affecting the response. Also, since a speed signal is operated based on a position signal, there have been problems in that when the vibration is minute, sufficient resolution as a torque correction signal cannot be obtained and the loop cannot be stabilized. For example, since the speed signal is determined by differentiating the position signal, when the position signal is vibrating at a rate of several pulses, the waveform of the speed signal becomes coarse and the accuracy declines. Since the torque correction signal takes the difference between the coarse speed signals, its waveform becomes coarser and sufficient resolution in not obtainable.

Therefore, the present invention aims to provide a position controller capable of solving these problems. Disclosure of the Invention.

In order to solve the abovedescribed problems, according to the present invention, a position controller comprising: a position control section in which a position command and a detected movement position are inputted and from which a speed command is outputted; a speed control section in which the speed command and a motor speed are inputted and from which a torque command is outputted; a current control section which receives the torque command to perform amplification and outputs a current; a motor which rotates by being supplied with the current; a motor position detector which detects a rotational displacement of the shaft of the motor and outputs a motor position signal; a speed processor which receives the motor position signal and outputs a motor speed signal; and a movement position detector which detects the position of a movement section driven by the motor and outputs a movement position signal and provided with: a motor speed-control function which makes the speed command and the motor speed signal coincident by feedback control; and a motor position-control function which makes the position command and the movement position signal coincident by feedback control, wherein said position controller is provided with:

a subtracter which subtracts the motor position signal from the movement position signal and outputs an angle-of-twist signal; a high-pass filter which outputs the angle-of-twist signal with its phase advanced, upon receiving the angle-of-twist signal; a low-pass filter in which the signal from the high-pass filter is inputted and which outputs the signal with only its high-frequency components eliminated; a coefficient multiplier which receives the signal from the low-pass filter, multiplies it by a torque corrective gain, and outputs a torque correction signal; a section for torque correction evaluation which varies the torque corrective gain based on a position deviation signal that is the difference between the position command and the movement position signal; and a subtracter which subtracts the torque correction signal from the torque command to produce a new torque command, and further wherein:

in the section for torque correction evaluation, when the absolute value of the position deviation signal is greater than a reference value, the torque corrective gain is set to zero and when the absolute value of the position deviation signal changes to be equal to the reference value or below, the torque corrective gain is changed from zero to a constant value, or in the section for torque corrective gain changeover evaluation, when the absolute value of the position deviation signal is greater than a reference value, the torque corrective gain is set to zero and when the absolute value of the position deviation signal changes to be equal to the reference value or below, the torque corrective gain is continuously changed from zero to a constant value.

Also, according to the present invention, a position controller comprising: a position control section in which a position command and a movement position are inputted and from which a speed command is outputted; a speed control section in which the speed command and a motor speed are inputted and from which a torque command is outputted; a current control section which receives the torque command to perform amplification and outputs a current; a motor which rotates by being supplied with the current; a motor position detector which detects a rotational displacement of the shaft of the motor and outputs a motor position signal; a speed processor which receives the motor position signal and outputs a motor speed signal; and a movement position detector which detects the position of a movement section driven by the motor and outputs a movement position signal and provided with: a motor speed-control function which makes the speed command and the motor speed signal coincident by feedback control; and a motor position-control function which makes the position command and the movement position signal coincident by feedback control, wherein said position controller is provided with:

an observer which comprises a proportional operating means for performing proportional operation, an integration operating means for performing integration operation, an inertia model for inputting a torque command outputted from the speed control section, an adder which adds the output from the inertia model, the output from the proportional operating means, and the output from the integration operating means, an integrator which integrates the output from the adder and outputs an estimated speed, and a subtracter which inputs a differential signal, obtained by subtracting the estimated speed from the motor speed outputted from the speed processor, into the proportional operating means and the integration operating means and which produces the differential signal obtained by subtracting the estimated speed from the motor speed as an output; a high-pass filter which receives the output signal from the observer and outputs the output signal with its phase advanced; a low-pass filter in which the signal from the high-pass filter is inputted and which outputs the signal with only its high-frequency components eliminated; a coefficient multiplier which receives the signal from the observer and multiplies it by a torque corrective gain and outputs a torque correction signal; a section for torque correction evaluation which varies the torque corrective gain based on a position deviation signal that is the difference between the position command and the movement position signal; and a subtracter which subtracts the torque correction signal from the torque command to produce a new torque command, and further wherein;

in the section for torque correction evaluation, when the absolute value of the position deviation is greater than a reference value, the torque corrective gain is set to zero and when the absolute value of the position deviation changes to be equal to the reference value or below, the torque corrective gain is changed from zero to a constant value, or in the section for torque correction evaluation, when the absolute value of the position deviation signal is greater than a reference value, the torque corrective gain is set to zero and when the absolute value of the position deviation signal changes to be equal to the reference value or below, the torque corrective gain is continuously changed from zero to a constant value.

Furthermore, according to the present invention, a position controller of a movement section, which performs speed control based on a speed feedback signal obtained by differentiating a rotational displacement signal of a servomotor and which performs position control based on a position feedback signal from a position detector attached to a movement section driven by the servomotor or the rotating shaft of the servomotor, comprises: a correction evaluation section which sets a variable gain to zero when a position deviation between a position command and the position feedback signal is greater than a predetermined reference value, and which sets the variable gain to a constant positive number when the position deviation becomes equal to the reference value or below; a differential processing section which differentiates a value obtained by multiplying the position deviation by the variable gain; and a low-pass filter in which the output from this differential processing section is inputted and from which a speed command correction amount is outputted, wherein the speed command correction amount is added to a speed command base amount to produce the speed command of the servomotor also, a position controller of a movement section, which performs speed control based on a speed feedback signal obtained by differentiating a rotational displacement signal of a servomotor and which performs position control based on a position feedback signal from a position detector attached to a movement section driven by the servomotor or the rotating shaft of the servomotor, comprises: a correction evaluation section which sets a variable gain to zero when a position deviation between a position command and the position feedback signal is greater than a predetermined reference value, and which sets the variable gain to a constant positive number when the position deviation becomes equal to the predetermined reference value or below; and a high-pass filter in which a value obtained by multiplying the position deviation by the variable gain is inputted and from which a speed correction amount is outputted, wherein the speed command correction amount is added to a speed command base amount to produce the speed command of the servomotor.

BEST MODE FOR CARRYING OUT THE INVENTION

Figure 1:
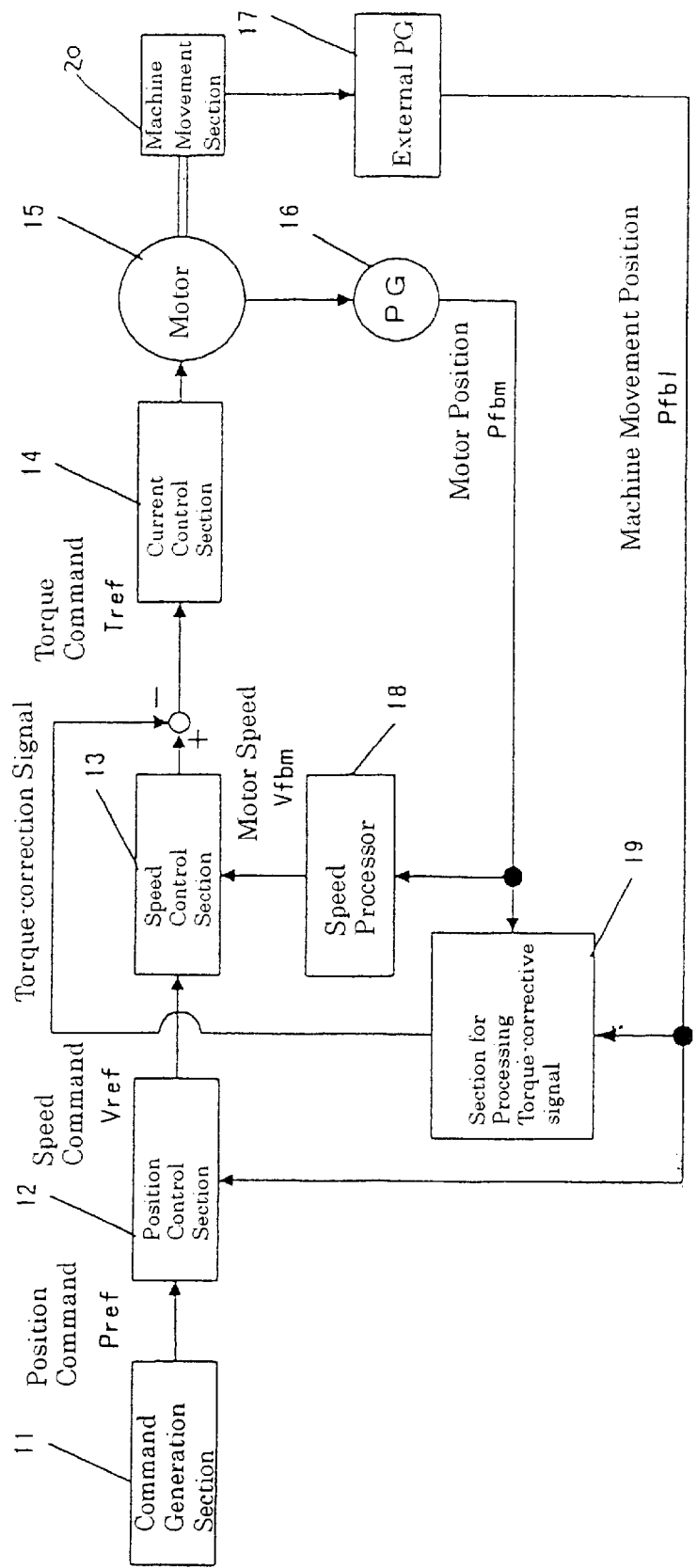
FIG. 1 is a block diagram of the motor control system to which a first embodiment of the present invention is applied.

Hereinafter, a first embodiment of the present invention will be described in detail based on the drawings. FIG. 1 is a block diagram of the motor control system to which the position controller of the present invention is applied. In the drawing, 11 denotes a command generation section from which position command Pref is outputted, 12 denotes a position control section in which the position command Pref and detected movement position Pfbl are inputted and from which speed command Vref is outputted, and which position-controls a motor so that the two input signals coincide, 13 denotes a speed control section in which the speed command Vref and operated motor speed Vfbm are inputted and from which torque command Tref is outputted, and which speed-controls a motor so that the two input signals coincide, 14 denotes a current control section which receives the torque command Tref and supplies a current to the motor 15, 16 denotes a motor position detector (PG) which detects a rotational displacement of a rotating shaft by being connected to the rotating shaft of the motor 15, 17 denotes a movement position detector (external PG) which detects the position of machine movement section 20 driven by the motor 15, 18 denotes a speed processor which receives a motor position signal Pfbm as an output signal from the motor position detector to differentiate the signal and outputs the abovedescribed motor speed Vfbm, 19 denotes a section for processing a torque-corrective signal in which the abovementioned motor position signal Pfbm and a movement position signal Pfbl as an output signal from the movement position detector are inputted and from which a torque correction signal is outputted.

Figure 2:
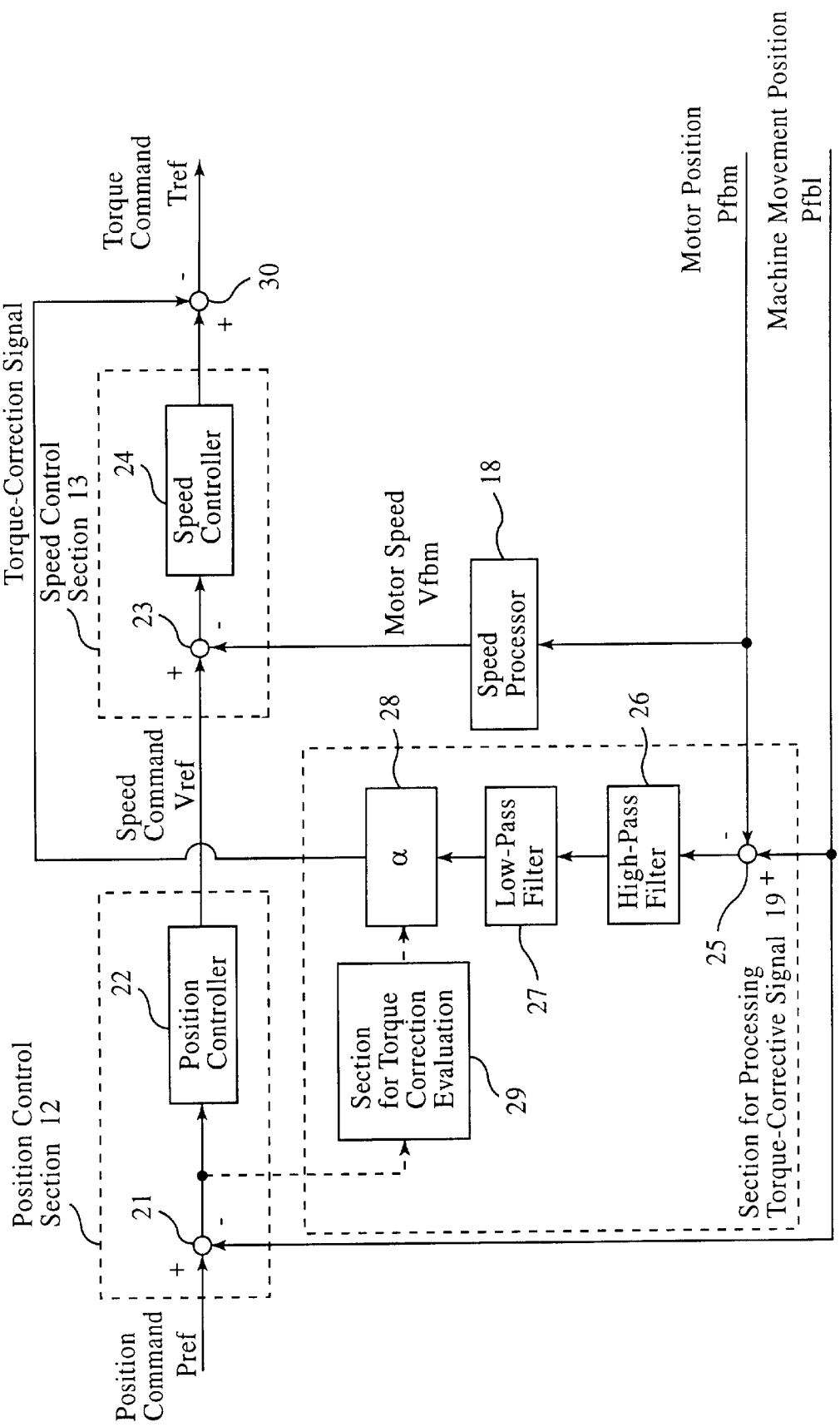
FIG. 2 is a block diagram showing a first embodiment of the present invention.

FIG. 2 is a detailed block diagram showing an embodiment of the present invention. In the drawing, 21 denotes a subtracter which subtracts the movement position signal Pfbl from the position command Pref and outputs a position deviation signal, 22 denotes a position controller which receives the position deviation signal and outputs speed command Vref, 23 denotes a subtracter which subtracts motor speed signal Vfbm from the speed command Vref and outputs a speed deviation signal, 24 denotes a speed controller which receives the speed deviation signal and outputs torque command, 25 denotes a subtracter which operates the difference between the movement position signal Pfbl and motor position signal Pfbm and outputs an angle-of-twist signal, 26 is a high-pass filter which outputs the angle-of-twist signal with its phase advanced, upon receiving the angle-of-twist signal, 27 denotes a low-pass filter which outputs the output signal from the high-pass filter with its high-frequency components eliminated, 28 denotes a coefficient multiplier which multiplies the output from the abovedescribed low-pass filter by a coefficient α as a torque corrective gain and outputs a torque correction signal, 29 denotes a section for torque correction evaluation which varies the torque corrective gain based on the abovedescribed position deviation signal, and 30 denotes a subtracter which subtracts the torque correction signal from the torque command and outputs a new torque command Tref.

If a motor and a movement section driven by the motor are spring-connected and the rigidity of the connected portion is weak, the loop can be stabilized by subtracting the difference between the movement section speed and motor speed, as the torque correction signal, from a torque command value, so that the vibration can be eliminated. However, if there is a low-frequency disturbance and thereby minute vibration occurs, the phase of the vibration and the phase of the torque correction signal do not match each other, therefore the vibration cannot be suppressed. In addition, since the speed signal is operated based on the position signal, if the vibration is minute, sufficient resolution as the torque correction signal cannot be obtained and the loop cannot be stabilized. Therefore, in the present embodiment, the resolution as the torque correction signal is secured by setting the angle-of-twist signal, which is the difference between the movement position and the motor position, to the torque correction value. Also, the vibration can be suppressed by advancing the phase of the torque correction signal by the high-pass filter 26 and matching the phase of the vibration to the phase of the torque correction signal. Also, to suppress the minute vibration, it is necessary to set a large torque corrective gain, however if a large torque corrective gain is set, the overall response deteriorates. Accordingly, in the section for torque correction evaluation, by setting the torque corrective gain to 0 when the absolute value of the position deviation is greater than a predetermined reference value and by setting the torque corrective gain to a constant value when the absolute value of the position deviation becomes equal to the predetermined reference value or below, only the minute vibration can be suppressed without changing the overall response even if a large torque corrective gain is set. Furthermore, by continuously changing the torque corrective gain, impacts when the torque corrective gain is changed can be reduced, whereby the loop is prevented from vibrating.

Figure 3:
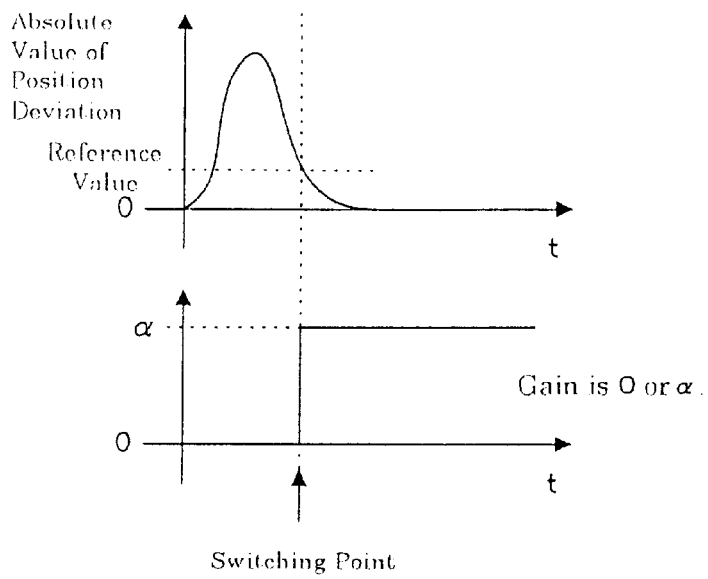
FIG. 3 are diagrams for explaining the change in the torque corrective gain.
Figure 3:
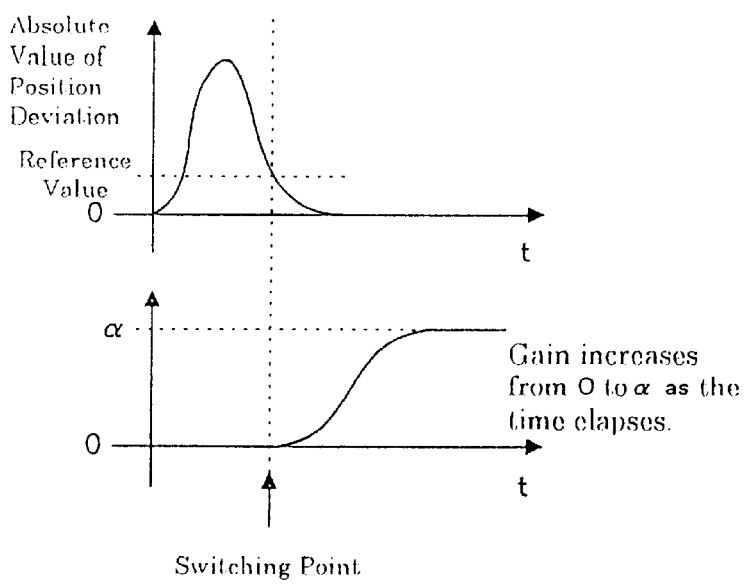

FIG. 3 are diagrams for explaining the change in the torque corrective gain. In FIG. 3(a), the gain changes from zero to α without becoming a mean value at a point where the absolute value of the position deviation becomes equal to the reference value or below. Also, in FIG. 3(b), the gain increases from zero to α with the elapse of time from a point where the absolute value of the position deviation becomes equal to the reference value or below. Effects in each case are as mentioned above.

Figure 4:
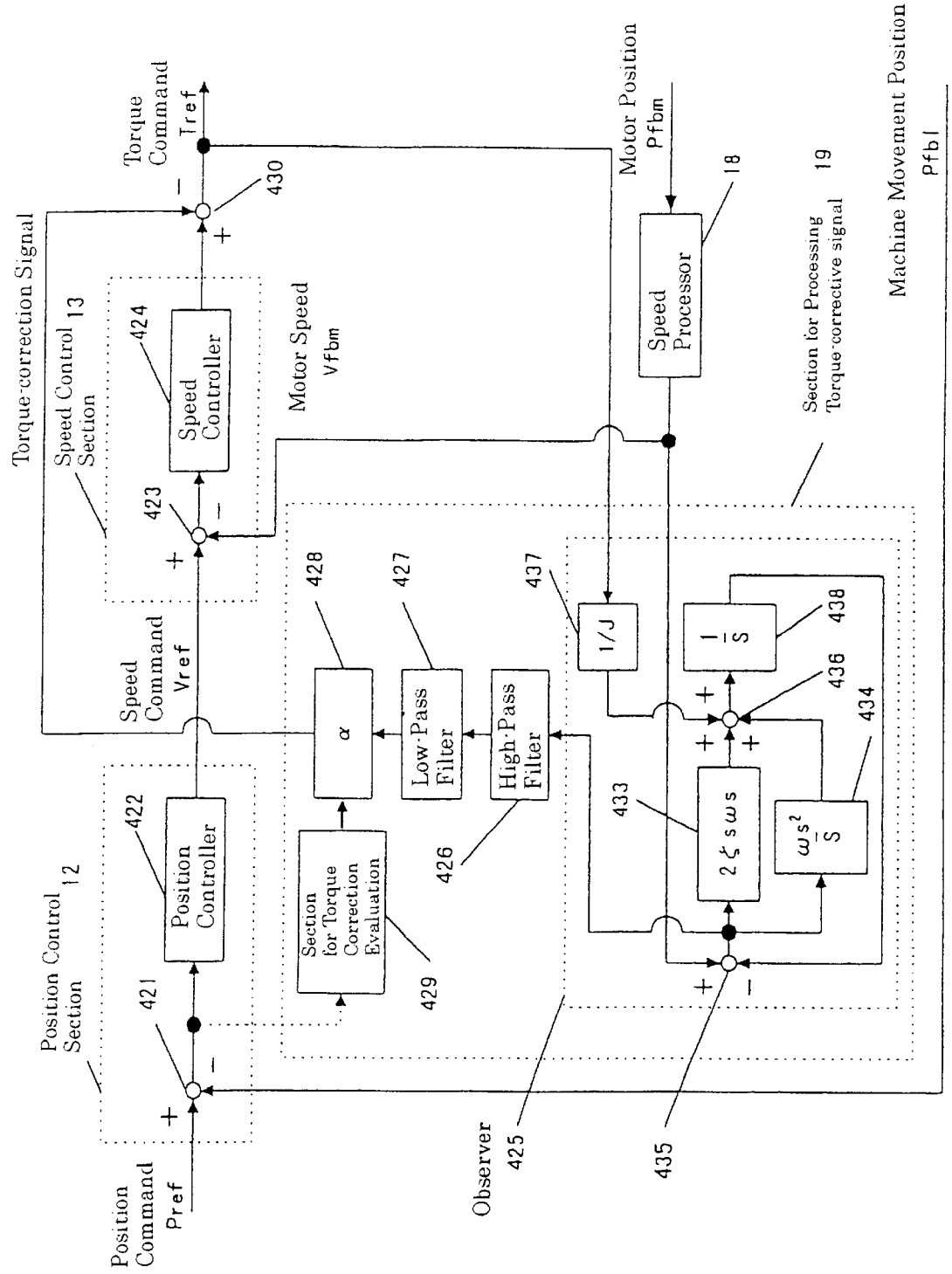
FIG. 4 is a block diagram showing a second embodiment of the present invention.

FIG. 4 is a detailed block diagram showing a second embodiment of the present invention. In the drawing, 421 denotes a subtracter which subtracts the movement position signal Pfbl from the position command Pref and outputs a position deviation signal, 422 denotes a position controller which receives the position deviation signal and outputs speed command Vref, 423 denotes a subtracter which subtracts motor speed signal Vfbm from the speed command Vref and outputs a speed deviation signal, 424 denotes a speed controller which receives the speed deviation signal and outputs torque command, 425 denotes an observer in which the torque command Tref and the abovedescribed motor speed Vfbm are inputted to operate an estimated speed and from which a differential signal obtained by subtracting the estimated speed from the motor speed. The observer comprises proportional operating means 433 for performing proportional operation; integration operating means 434 for multiplying by a gain $\omega_s^2$ and performing integration operation; inertia model 437 for inputting the torque command; adder 436 for adding the output from the inertia model, the output from the proportional operating means, and the output from the integration operating means; integrator 438 which integrates the output from the adder and outputs an estimated speed; and subtracter 435 which inputs a differential signal, obtained by subtracting the estimated speed from the motor speed, into the proportional operating means and integration operating means. 426 denotes a high-pass filter which receives the output signal from the observer and outputs the output signal with its phase advanced, 427 denotes a low-pass filter which outputs the output signal from the high-pass filter with its high-frequency components eliminated, 428 denotes a coefficient multiplier which multiplies the output from the above-described low-pass filter by a coefficient α as a torque corrective gain and outputs a torque correction signal, 429 denotes a section for torque correction evaluation which varies the abovedescribed torque corrective gain based on the abovedescribed position deviation signal, and 430 denotes a subtracter which subtracts the torque correction signal from the torque command and outputs a new torque command Tref.

If a motor and a movement section driven by the motor are spring-connected and the rigidity of the connected portion is weak, the loop can be stabilized by subtracting the difference between the movement section speed and motor speed, as the torque correction signal, from a torque command value, so that the vibration can be eliminated. However, if there is a low-frequency disturbance and thereby minute vibration occurs, the phase of the vibration and the phase of the torque correction signal do not match each other, therefore the vibration cannot be suppressed. In addition, since the speed signal is operated based on the position signal, if the vibration is minute, sufficient resolution as the torque correction signal cannot be obtained and the loop cannot be stabilized. Therefore, in the present embodiment, by operating an estimated speed by the observer and setting a differential signal, obtained by subtracting the estimated speed from the motor speed, to the torque corrective value, vibrational components can be detected at a high resolution even in the minute vibration having a low frequency, so that a torque correction signal can be produced. Also, the vibration can be suppressed by advancing the phase of the torque correction signal by the high-pass filter 426 and matching the phase of the vibration to the phase of the torque correction signal. Also, to suppress the minute vibration, it is necessary to set a large torque corrective gain, however if a large torque corrective gain is set, the overall response deteriorates. Accordingly, in the section for torque correction evaluation, by setting the torque corrective gain to 0 when the absolute value of the position deviation is greater than a predetermined reference value and by setting the torque corrective gain to a constant value when the absolute value of the position deviation becomes equal to the predetermined reference value or below, only the minute vibration can be suppressed without changing the overall response even if a large torque corrective gain is set. Furthermore, by continuously changing the torque corrective gain, impacts when the torque corrective gain is changed can be reduced, whereby the loop is prevented from vibrating.

Figure 5:
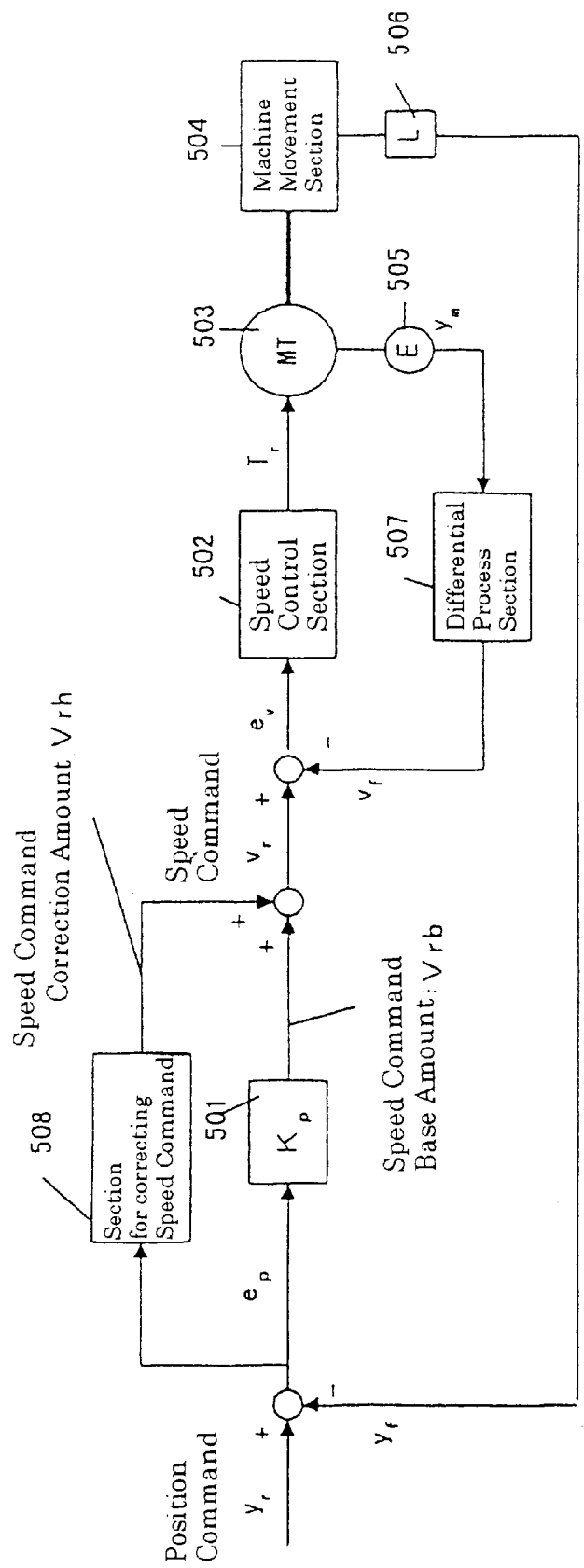
FIG. 5 is a block diagram showing a third embodiment of the present invention.

A third embodiment of the present invention will be described with reference to the drawings. FIG. 5 is a constructional block diagram of the principal of the control system. FIG. 5 shows a prior-art position control system to which a section for correcting speed command 508 is added. Position deviation $e_p$ between position command $y_r$ and position feedback signal $y_f$ from position detector 506 such as a linear scale is operated. When the position control system constructs a semi-closed loop, a position feedback signal can be obtained from encoder 505 attached to servo motor 503 and position deviation $e_p$ is operated. In position control section 501, speed command base amount $V_{rb}$ is determined by multiplying the abovedescribed position deviation $e_p$ by position control gain $K_p$, and speed command correction amount $V_{rb}$ is operated in the section for correcting speed command 508 based on the abovementioned position deviation $e_p$, which will be mentioned below.

A signal in that the speed command base amount $V_{rb}$ and the speed command correction amount $V_{rh}$ are synthesized is set as speed command $V_r$. Speed control section 502 operates torque command $T_r$ based on speed deviation $e_v$ between the abovementioned speed command $v_r$ and speed feedback signal $v_f$ obtained, in differential processing section 507, by differentiating servomotor position signal $y_m$ from the encoder 505 attached to the servomotor 503, and outputs the torque command $T_r$ to the servomotor 503.

Figure 6:
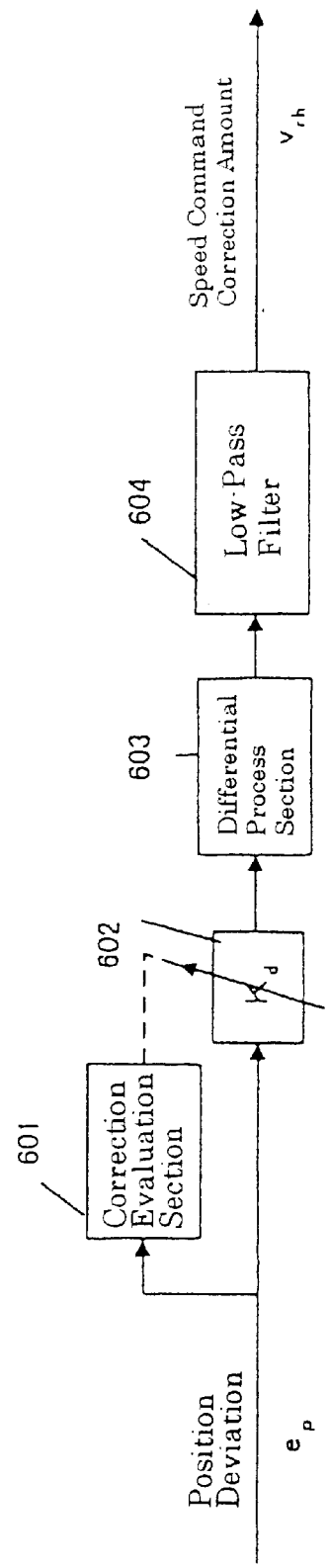
FIG. 6 is a diagram illustrative of a method for producing a speed command correction amount.
Figure 7:
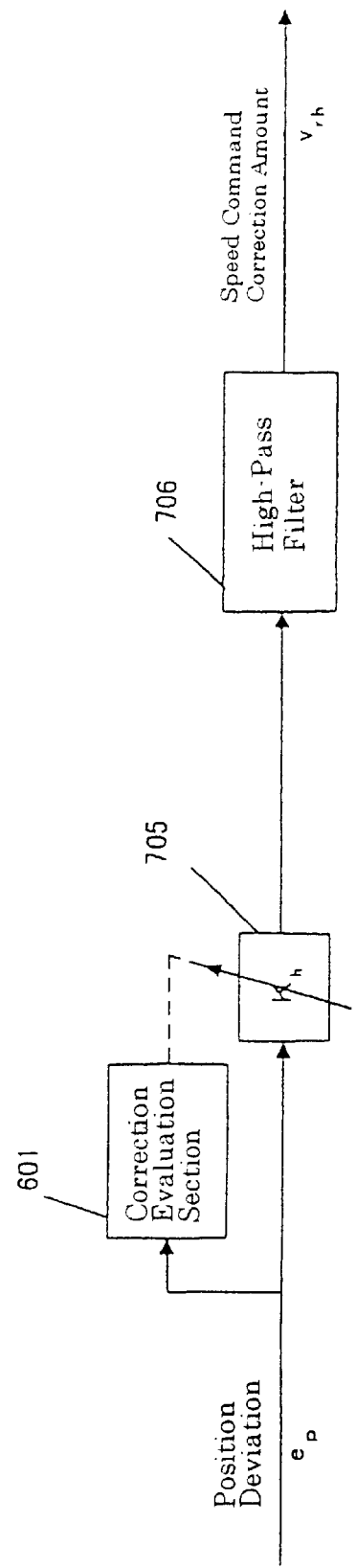
FIG. 7 is a diagram illustrative of a method for producing a speed command correction amount.
Figure 8:
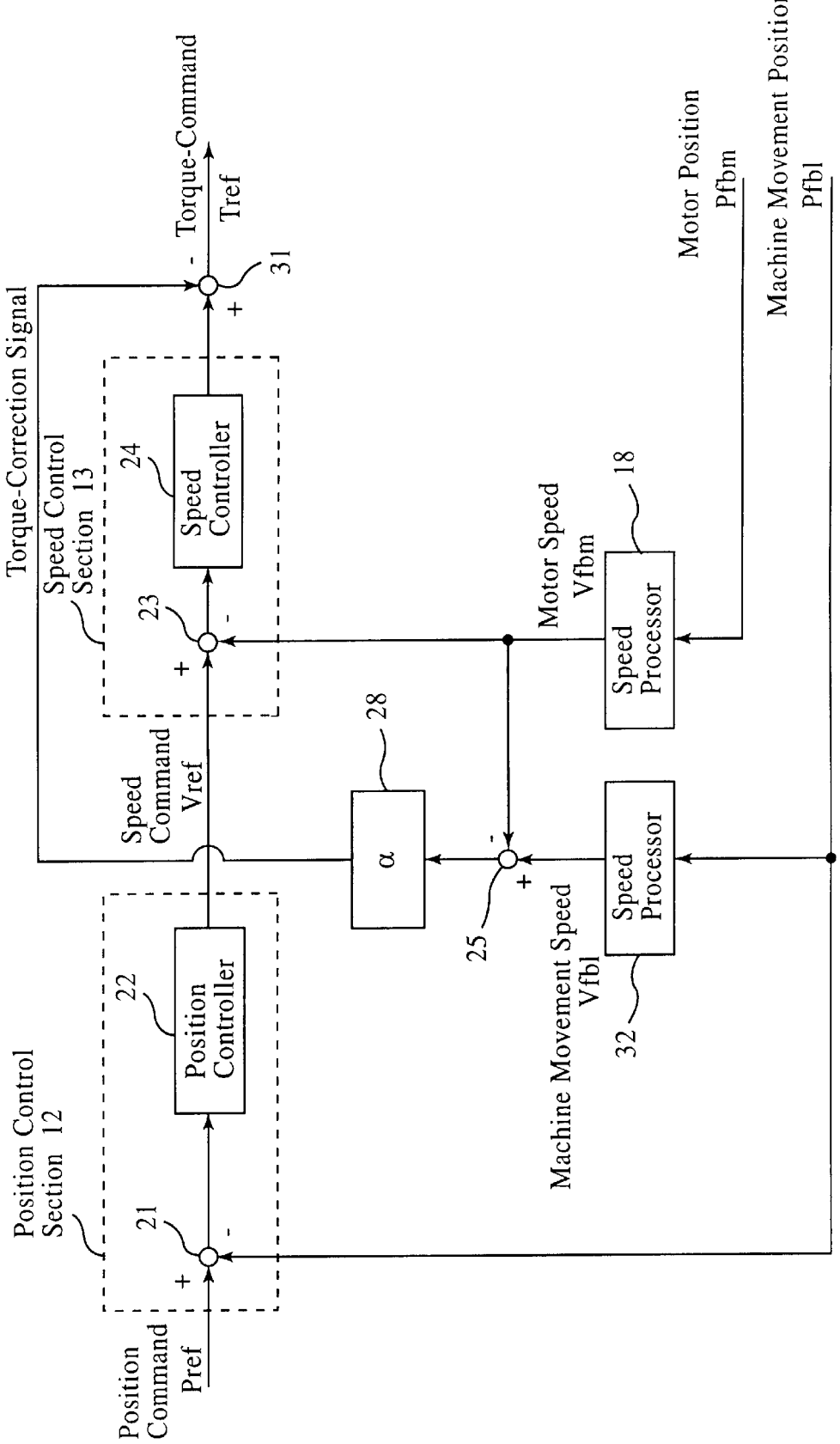
FIG. 8 is a block diagram for explaining the prior-art method whereby the loop is stabilized by correcting the torque command value.
Figure 9:
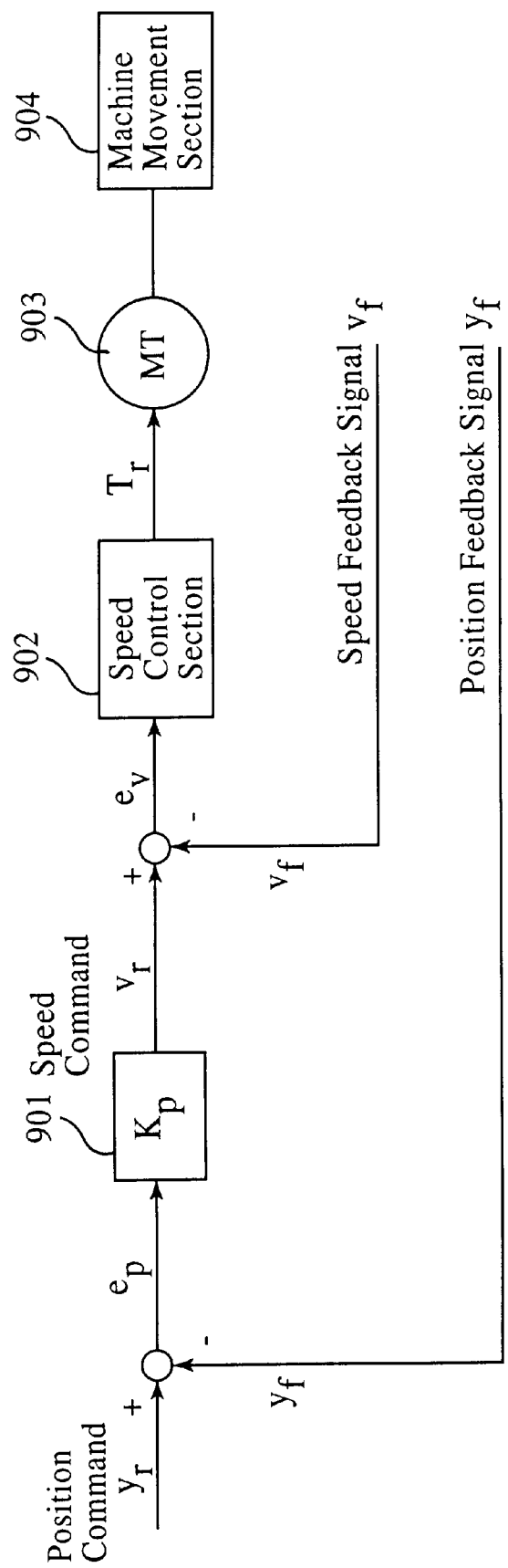
FIG. 9 is a block diagram of the prior-art position control system.
Figure 10:
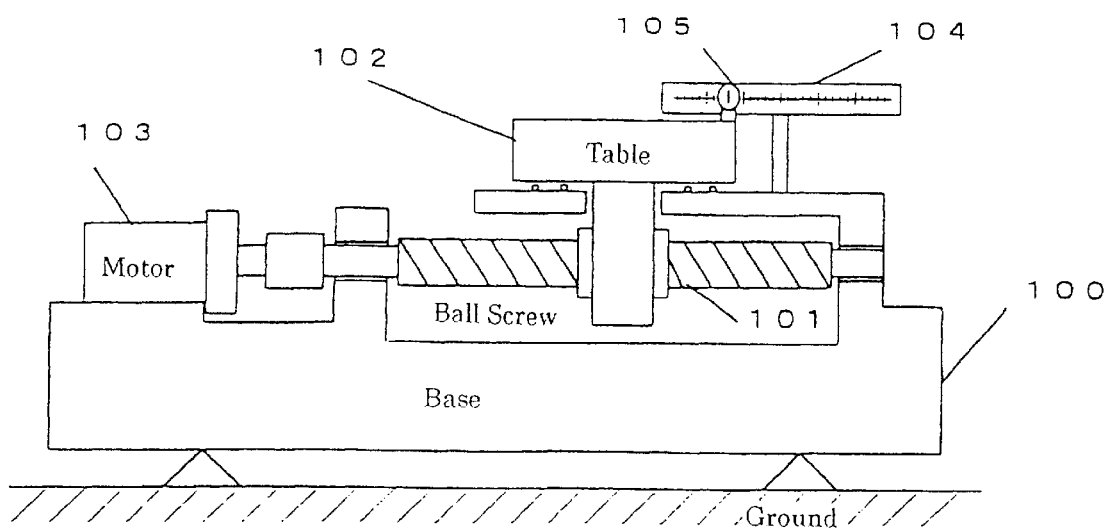
FIG. 10 is a system construction view to which the position control system is applied.

FIG. 6 and FIG. 7 are diagrams each illustrative of a method for producing a speed command correction amount, showing one embodiment of the present invention. In FIG. 6, when the abovedescribed position deviation $e_p$ is greater than predetermined reference value $E_p$, correction evaluation section 601 sets variable gain $K_d$ of gain setting section 602 to 0 and when the abovedescribed position deviation $e_p$ becomes equal to the predetermined reference value $E_p$ or below, the abovementioned correction evaluation section 601 sets the abovementioned variable gain $K_d$ to a constant positive number, and a value obtained by multiplying the abovedescribed position deviation $e_p$ by the variable gain $K_d$ is differentiated in differential processing section 603 and becomes speed command correction amount $v_{rh}$ via low-pass filter 604 ($1/(1+\tau s)$:$\tau$ indicates time constant, s indicates Laplacian operator, the same is applied in the following.) On the other hand, in FIG. 7, when the abovedescribed position deviation $e_p$ is greater than predetermined reference value $E_p$, correction evaluation section 601 sets variable gain $K_h$ of gain setting section 705 to 0 and when the abovedescribed position deviation $e_p$ becomes equal to the predetermined reference value $E_p$ or below, the abovementioned correction evaluation section 601 sets the abovementioned variable gain $K_h$ to a constant positive number, and a value obtained by multiplying the abovedescribed position deviation $e_p$ by the variable gain $K_h$ becomes speed command correction amount $v_{rh}$ via high-pass filter 706 ($\tau s/(1+\tau s)$). To set the variable gains $K_d$ and $K_h$ to constant positive numbers in FIGS. 6 and 7 means to add a damping compensator into the position loop system. That is, when the position deviation $e_p$ becomes small, an effective damping effect is created to suppress the low-frequency disturbance and on the other hand, when the position deviation $e_p$ becomes large, a damping effect is eliminated, therefore it is possible to make a control amount follow a target quickly, whereby shortening the overall positioning time.

INDUSTRIAL APPLICABILITY

As has been described above, in the case where the control is performed by the closed loop method, the present invention can provide a position controller capable of controlling only the vibration without affecting the overall response even when the low-frequency disturbance exists and the minute vibration occurs.

Also, when low-frequency disturbance exists in a large amount, a positioning time can be shortened by adjusting the variable gain of the section for correcting speed command depending on the size of the position deviation.

To carry out the speed command correction only when the position deviation became equal to a predetermined reference value or below makes it possible, when the movement section which was controlled is far from the target position, to eliminate the damping effect and cause the control amount to follow the target quickly, and when the movement section which was controlled becomes close to the target position, to make the damping effect effective and suppress the low-frequency disturbance, and thereby realize positioning with high accuracy in a short time.

What is claimed is:

1. A position controller comprising: a position control section in which a position. command and a detected movement position are inputted and from which a speed command is outputted; a speed control section in which the speed command and a motor speed are inputted and from which a torque command is outputted; a current control section which receives the torque command to perform amplification and outputs a current; a motor which rotates by being supplied with the current; a motor position detector which detects a rotational displacement of the shaft of the motor and outputs a motor position signal; a speed processor which receives the motor position signal and outputs a motor speed signal; and a movement position detector which detects the position of a movement section driven by the motor and outputs a movement position signal and provided with: a motor speed-control function which makes the speed command and the motor speed signal coincident by feedback control; and a motor position-control function which makes the position command and the movement position signal coincident by feedback control, wherein said position controller is provided with:

a subtracter which subtracts the motor position signal from the movement position signal and outputs an angle-of-twist signal; a high-pass filter which outputs the angle-of-twist signal with its phase advanced, upon receiving the angle-of-twist signal; a low-pass filter in which the signal from the high-pass filter is inputted and which outputs the signal with only its high-frequency components eliminated; a coefficient multiplier which receives the signal from the low-pass filter, multiplies it by a torque corrective gain, and outputs a torque correction signal; a section for torque correction evaluation which varies the torque corrective gain based on a position deviation signal that is the difference between the position command and the movement position signal; and a subtracter which subtracts the torque correction signal from the torque command to produce a new torque command.

2. A position controller as set forth in claim 1, wherein in said section for torque correction evaluation, when the absolute value of the position deviation signal is equal to or greater than a reference value, the torque corrective gain is set to zero and when the absolute value of the position deviation signal changes to be equal to the reference value or below, the torque corrective gain is changed from zero to a constant value.

3. A position controller as set forth in claim 1, wherein in said section for torque correction evaluation, when the absolute value of the position deviation signal is greater than a reference value, the torque corrective gain is set to zero and when the absolute value of the position deviation signal changes to be equal to the reference value or below, the torque corrective gain is continuously changed from zero to a constant value.

4. A position controller comprising: a position control section in which a position command and a movement position are inputted and from which a speed command is outputted; a speed control section in which the speed command and a motor speed are inputted and from which a torque command is outputted; a current control section which receives the torque command to perform amplification and outputs a current; a motor which rotates by being supplied with the current; a motor position detector which detects a rotational displacement of the shaft of the motor and outputs a motor position signal; a speed processor which receives the motor position signal and outputs a motor speed signal; and a movement position detector which detects the position of a movement section driven by the motor and outputs a movement position signal and provided with: a motor speed-control function which makes the speed command and the motor speed signal coincident by feedback control; and a motor position-control function which makes the position command and the movement position signal coincident by feedback control, wherein said position controller is provided with:

an observer which comprises a proportional operating means for performing proportional operation, an integration operating means for performing integration operation, an inertia model for multiplying by a gain $\omega_s^2$ and inputting a torque command outputted from the speed control section, an adder which adds the output from the inertia model, the output from the proportional operating means, and the output from the integration operating means, an integrator which integrates the output from the adder and outputs an estimated speed, and a subtracter which inputs a differential signal, obtained by subtracting the estimated speed from the motor speed outputted from the speed processor, into the proportional operating means and the integration operating means and which produces the differential signal obtained by subtracting the estimated speed from the motor speed as an output; a high-pass filter which receives the output signal from the observer and outputs the output signal with its phase advanced; a low-pass filter in which the signal from the high-pass filter is inputted and which outputs the signal with only its high-frequency components eliminated; a coefficient multiplier which receives the signal from the low-pass filter and multiplies it by a torque corrective gain and outputs a torque correction signal; a section for torque correction evaluation which varies the torque corrective gain based on a position deviation signal that is the difference between the position command and the movement position signal; and a subtracter which subtracts the torque correction signal from the torque command to produce a new torque command.

5. A position controller as set forth in claim 4, wherein in said section for torque correction evaluation, when the absolute value of the position deviation is greater than a reference value, the torque corrective gain is set to zero and when the absolute value of the position deviation changes to be equal to the reference value or below, the torque corrective gain is changed from zero to a constant value.

6. A position controller as set forth in claim 4, wherein in the section for torque correction evaluation, when the absolute value of the position deviation signal is greater than a reference value, the torque corrective gain is set to zero and when the absolute value of the position deviation signal changes to be equal to the reference value or below, the torque corrective gain is continuously changed from zero to a constant value.

7. A position controller of a movement section, which performs speed control based on a speed feedback signal obtained by differentiating a rotational displacement signal of a servomotor and which performs position control based on a position feedback signal from a position detector attached to a movement section driven by the servomotor or the rotating shaft of the servomotor, comprises: a correction evaluation section which sets a variable gain to zero when a position deviation between a position command and the position feedback signal is greater than a predetermined reference value, and which sets the variable gain to a constant positive number when the position deviation becomes equal to the reference value or below; a differential processing section which differentiates a value obtained by multiplying the position deviation by the variable gain; and a low-pass filter in which the output from this differential processing section is inputted and from which a speed command correction amount is outputted, wherein the speed command correction amount is added to a speed command base amount to produce the speed command of the servomotor.

8. A position controller of a movement section, which performs speed control based on a speed feedback signal obtained by differentiating a rotational displacement signal of a servomotor and which performs position control based on a position feedback signal from a position detector attached to a movement section driven by the servomotor or the rotating shaft of the servomotor, comprises: a correction evaluation section which sets a variable gain to zero when a position deviation between a position command and the position feedback signal is greater than a predetermined reference value, and which sets the variable gain to a constant positive number when the position deviation becomes equal to the predetermined reference value or below; and a high-pass filter in which a value obtained by multiplying the position deviation by the variable gain is inputted and from which a speed correction amount is outputted, wherein the speed command correction amount is added to a speed command base amount to produce the speed command of the servomotor.

* * * * *